(12) United States Patent
Scharff et al.

(10) Patent No.: US 6,411,287 B1
(45) Date of Patent: Jun. 25, 2002

(54) STRESS SEAL FOR ACOUSTIC WAVE TOUCHSCREENS

(75) Inventors: Daniel H. Scharff, San Leandro; Don Armstrong, Belmont, both of CA (US)

(73) Assignee: Elo TouchSystems, Inc., Fremont, CA (US)

( * ) Notice: Subject to any disclaimer, the term of this patent is extended or adjusted under 35 U.S.C. 154(b) by 0 days.

(21) Appl. No.: 09/392,577

(22) Filed: Sep. 8, 1999

(51) Int. Cl.⁷ .................................................. G09G 5/00
(52) U.S. Cl. .................................. 345/177; 277/654
(58) Field of Search .................................. 345/173, 174, 345/175, 176, 177, 178, 179, 180; 277/630, 654, 637, 628, 639; 341/22

(56) References Cited

U.S. PATENT DOCUMENTS

| 4,642,423 | A | 2/1987 | Adler |
| 4,644,100 | A | 2/1987 | Brenner et al. |
| 4,645,870 | A | 2/1987 | Adler |
| 4,700,176 | A | 10/1987 | Adler |
| 4,746,914 | A | 5/1988 | Adler |
| 4,791,416 | A | 12/1988 | Adler |
| 4,825,212 | A | 4/1989 | Adler et al. |
| 4,859,996 | A | 8/1989 | Adler et al. |
| 4,880,665 | A | 11/1989 | Adler et al. |
| RE33,151 | E | 1/1990 | Adler |
| 5,072,427 | A | 12/1991 | Knowles |
| 5,162,618 | A | 11/1992 | Knowles |
| 5,177,327 | A | 1/1993 | Knowles |
| 5,243,148 | A | 9/1993 | Knowles |
| 5,260,521 | A | 11/1993 | Knowles |
| 5,329,070 | A | 7/1994 | Knowles |
| 5,332,238 | A | 7/1994 | Borucki |
| 5,573,077 | A | 11/1996 | Knowles |
| 5,591,945 | A | 1/1997 | Kent |
| 5,708,461 | A | 1/1998 | Kent |
| 5,739,479 | A | 4/1998 | Davis-Cannon et al. |
| 5,784,054 | A | 7/1998 | Armstrong et al. |
| 5,854,450 | A | 12/1998 | Kent |
| 6,254,105 | B1 * | 7/2001 | Rinde et al. ................ 345/177 |

* cited by examiner

Primary Examiner—Dennis-Doon Chow

(57) ABSTRACT

A sealing system for use with acoustic touchscreens is provided. The system includes a seal coupled to a frame, the frame being positioned directly over the acoustic touchscreen components, e.g., acoustic transducers, reflective arrays, etc. such that the seal prevents contamination of the underlying components. The system uses a plurality of tensioning elements that are either integral to, or separate from, the frame. The tensioning elements are preferably coupled at the four corners of the CRT, and more preferably coupled to the CRT mounting tabs. Assuming an approximately spherically curved touchscreen surface, the tensioning elements provide a uniform compressive force per unit length along the entire perimeter of the seal. As a consequence of the tensioning elements, the frame can be extremely thin, lightweight, and flexible, thus allowing it to substantially conform to the shape of the touch surface. Additionally, a very small and uniform gap can be maintained between the frame and the touch surface, e.g. less than 1 millimeter, thus allowing the designer to select from a wider range of sealing materials that meet the acoustic signal absorption requirements of the system while providing a robust contamination seal.

23 Claims, 7 Drawing Sheets

STRESS SEAL FOR ACOUSTIC WAVE TOUCHSCREENS

TECHNICAL FIELD OF THE INVENTION

The present invention relates generally to acoustic touchscreens and, more particularly, to a sealing system for use with acoustic wave touchscreens.

BACKGROUND OF THE INVENTION

Touchscreens are used in conjunction with a variety of display types, including cathode ray tubes (i.e., CRTs) and liquid crystal display screens (i.e., LCD screens), as a means of inputting information into a data processing system. When placed over a display or integrated into a display, the touchscreen allows a user to select a displayed icon or element by touching the screen in a location corresponding to the desired icon or element. Touchscreens have become common place in a variety of different applications including, for example, point-of-sale systems, information kiosks, automated teller machines (i.e., ATMs), data entry systems, gaming machines, ticketing machines, etc.

A specific type of touchscreen, an acoustic touchscreen, has a touch-sensitive area on which the occurrence and location of a touch is sensed via the touch's effect on acoustic waves propagating across the touchscreen surface. A common type of acoustic touchscreen employs Rayleigh waves (a term which, as used herein, subsumes quasi-Rayleigh waves). Illustrative disclosures relating to Rayleigh wave touchscreens include Adler, U.S. Pat. Nos. 4,642,423; 4,645,870; 4,700,176; 4,746,914; 4,791,416; and U.S. Pat. No. Re 33,151; Adler et al., U.S. Pat. Nos. 4,825,212; 4,859,996; and 4,880,665; Brenner et al., U.S. Pat. No. 4,644,100; Davis-Cannon et al., U.S. Pat. No. 5,739,479; and Kent, U.S. Pat. Nos. 5,708,461 and 5,854,450. Acoustic touchscreens employing other types of acoustic waves such as Lamb or shear waves, or combinations of different types of acoustic waves (including combinations involving Rayleigh waves) are also known, illustrative disclosures including Kent, U.S. Pat. Nos. 5,591,945 and 5,854,450; Knowles, U.S. Pat. Nos. 5,072,427; 5,162,618; 5,177,327; 5,243,148; 5,329,070; and 5,573,077; and Knowles et al., U.S. Pat. No. 5,260,521. The documents cited in this paragraph are incorporated herein by reference for all purposes.

Touchscreen applications may require that the touchscreen operate in an outdoor environment or in a relatively harsh indoor environment such as a factory or restaurant. Therefore the touchscreen may be subjected to rain, fog, wind, dust, cleaning solutions, sprays, liquid spills, etc. As a consequence of these conditions, typically some form of seal is required between the touchscreen and the system enclosure. Generally, however, it is difficult to achieve a satisfactory seal in an acoustic touchscreen due to the touch detection mechanism, i.e., surface propagating acoustic waves, as the seal may absorb an excessive amount of the acoustic energy, thereby compromising touchscreen performance. As a general rule, the acoustic loss attributable to the sealing system should be less than 6 dB.

U.S. Pat. No. 5,332,238 discloses a sealing system using a resilient, compressible foam strip that is substantially transmissive to surface acoustic wave energy. An acceptable level of attenuation is achieved by placing an open-cell surface against the touchscreen surface or by restricting seal contact to a corner of the foam strip. The foam strip also includes at least one membrane surface extending between the touchscreen and the housing which is impermeable to liquids. A structure for maintaining the foam strip in position is also disclosed.

An alternate sealing system is disclosed in U.S. Pat. No. 5,784,054. As disclosed, the seal is formed of a closed cell foam in which the touchscreen contacting surface is covered with a liquid impervious barrier. Alternatively, the seal may be formed of an expanded polymer such as expanded polytetrafluoroethylene. In at least one embodiment of the disclosed system, the seal is used in a CRT-based monitor without requiring replacement or modification of the normal housing or bezel.

What is needed in the art is a sealing system which provides a uniform compressive force along the perimeter of the seal and which can be used with a conventional CRT display device. The present invention provides such a sealing system.

SUMMARY OF THE INVENTION

The present invention provides a sealing system for use with acoustic touchscreens. The system includes a seal coupled to a frame, the frame being positioned directly over the acoustic touchscreen components, e.g., acoustic transducers, reflective arrays, etc. such that the seal prevents contamination of the underlying components. The system uses a plurality of tensioning elements that are either integral to, or separate from, the frame. The tensioning elements are preferably coupled at the four corners of the CRT, and more preferably coupled to the CRT mounting tabs. Assuming an approximately spherically curved touchscreen surface, the tensioning elements provide a uniform compressive force per unit length along the entire perimeter of the seal. As a consequence of the tensioning elements, the frame can be extremely thin, lightweight, and flexible, thus allowing it to substantially conform to the shape of the touch surface. Additionally, a very small and uniform gap can be maintained between the frame and the touch surface, e.g., less than 1 millimeter, thus allowing the designer to select from a wider range of sealing materials that meet the acoustic signal absorption requirements of the system while providing a robust contamination seal.

In one embodiment of the invention, the frame is fabricated from a single piece of plastic. Each of the four corners of the frame includes a channel or groove that is used to attach the frame to the CRT mounting tabs via retaining straps. Preferably this embodiment of the frame also includes a plurality of wiring channels for containing the transducer wires and corner cut-aways to allow transducer access. Although this embodiment is preferably used with a direct-on-tube acoustic touchscreen system, it can also be coupled to a display panel using an acoustic touchscreen overlay.

In another embodiment of the invention, a single piece frame is coupled to the CRT mounting tabs via outwardly spring-loaded fasteners, complimentary fasteners, bolts, or other fastening means that provide tension at the four corners of the frame. Corner cut-aways or access ports many be used to provide acoustic transducer access or the frame may cover and thus further protect the transducers.

In yet another embodiment of the invention, a retaining ring is fit around the body of the CRT. In one configuration the frame includes corner channels through which retaining straps are run. The retaining strap from each corner is coupled to the CRT retaining ring. Alternatively, tension straps may be positioned over the top surface of each side of the frame and attached at either end to the retaining ring.

In yet another embodiment of the invention, a frame is attached directly to an acoustic touchscreen overlay substrate. Preferably the frame is coupled to the overlay substrate using clips and tensioning cables.

A further understanding of the nature and advantages of the present invention may be realized by reference to the remaining portions of the specification and the drawings.

DESCRIPTION OF THE SPECIFIC EMBODIMENTS

Figure 1:
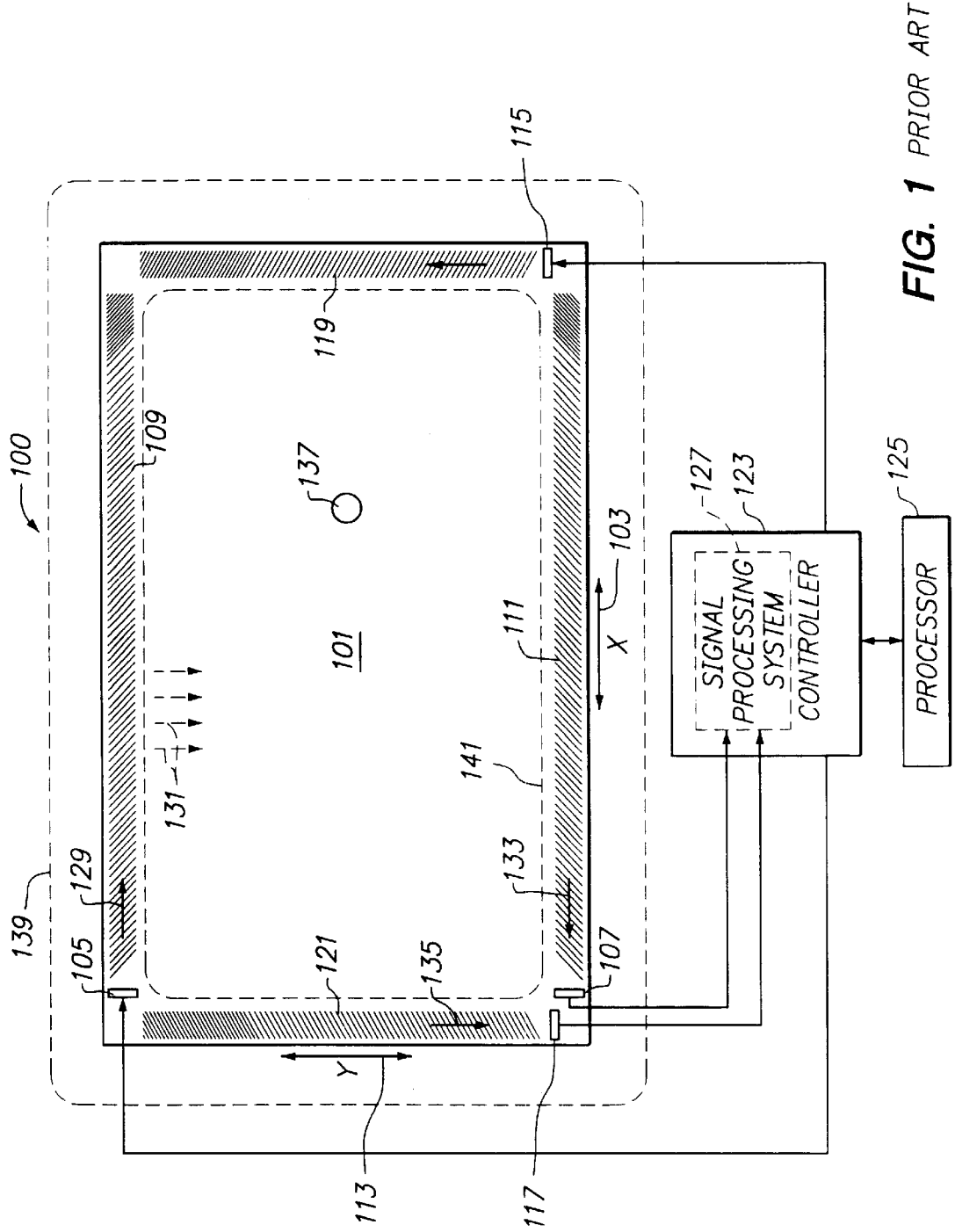
FIG. 1 is an illustration of an acoustic touchscreen according to the prior art.

FIG. 1 is an illustration of a touchscreen 100 utilizing surface acoustic waves according to the prior art. This type of touchscreen is suitable for use with a cathode ray tube (i.e., CRT) display, liquid crystal display (i.e., LCD), plasma display, electroluminescent display, or other display type. Surface acoustic wave (i.e., SAW) touchscreens are disclosed in U.S. Pat. Nos. 4,644,100, 4,700,176, 5,708,461, 5,854,450, and U.S. Pat. No. Re. 33,151, the complete disclosures of which are incorporated herein for all purposes. SAW touchscreens will be discussed briefly herein, thus allowing a fuller understanding of the present invention.

Touchscreen 100 includes a surface 101 suitable for propagating surface acoustic waves, e.g. Rayleigh waves, Love waves, and other waves sensitive to a touch on the surface. To determine touch coordinates along an x-axis 103, a system is used that includes a transmitter transducer 105, a receiver transducer 107, and a pair of associated reflective arrays 109 and 111, respectively. A similar system is used to determine coordinates along a y-axis 113 which includes a transmitter transducer 115, a receiver transducer 117, and associated reflective arrays 119 and 121. Transmitter transducers 105 and 115 are coupled to a controller 123, typically under the control of a processor 125. Receiver transducers 107 and 117 are also coupled to controller 123 which includes a signal processing system 127. Although a signal may be simultaneously applied to transducers 105 and 115, preferably the signals to the transducers are sequential, thus reducing interference and cross-talk between the two coordinate sensing channels. The sequential sensing approach also reduces circuit complexity as many of the necessary circuits can be alternately used in the two sensing channels thereby eliminating the need for unnecessary circuit duplication. In order to further reduce circuit complexity, typically the prior art sends the same frequency burst to both transmitter transducers 105 and 115.

One of the sensing channels will now be described in further detail. The description of this channel is equally applicable to the second sensing channel. In order to determine a touch coordinate along x-axis 103 for substrate 101, transmitter transducer 105 sends a burst acoustic wave along a path 129. Reflective array 109 includes a plurality of reflective elements that are disposed along path 129, each element oriented at an approximately 45 degree angle to path 129. The reflective elements are designed to extract a plurality of wave components 131 from the acoustic wave traveling along path 129, transmitting components 131 along the surface of the touchscreen, preferably in a direction parallel to y-axis 113. The pattern design for array 109 is such that the individual acoustic components 131 reflected by the individual reflectors coherently add together, thus creating a substantially planar wavefront with uniform amplitude. Wave components 131 are recombined by a plurality of reflective elements within array 111, these elements directing the wave components along a path 133 to receiver transducer 107. Receiver transducer 107 converts the wavefront information received along path 133 into an electrical signal. In a similar manner, transmitting transducer 115 and receiving transducer 117 cooperate with acoustic reflective arrays 119 and 121, transducer 117 converting the wavefront information received along path 135 into an electrical signal.

When touchscreen, 101 is touched by an object such as a stylus or finger, for example at a location 137, some of the energy in the acoustic x- and y-axis wavefronts is absorbed. As a result of this attenuation, the wavefront information received by transducers 107 and 117 is perturbed. Through analysis of the signals from the two receiving transducers, for example utilizing arrival time analysis, the x- and y-coordinates of the touch can be determined by processor 125.

Touchscreen 101 can either be an overlay touchscreen, i.e., fabricated on a separate substrate (e.g., a glass substrate) that is mounted over a display panel or it can be a direct-on-tube touchscreen, i.e., fabricated directly onto the face of the display panel (e.g., a CRT panel). Typically associated with touchscreen 101 is a housing 139 that includes a bezel portion 141 that overlays touchscreen 101. Bezel portion 141 serves multiple purposes. First, it defines the touch-sensitive area. Second, it results in a more aesthetically pleasing touchscreen as the transducers, reflective elements, and other components are hidden from sight. Third, it protects the concealed components from contamination and/or damage. Fourth, it provides a convenient mounting location for a sealing system, the sealing system further protecting the concealed components from contamination.

Figure 2:
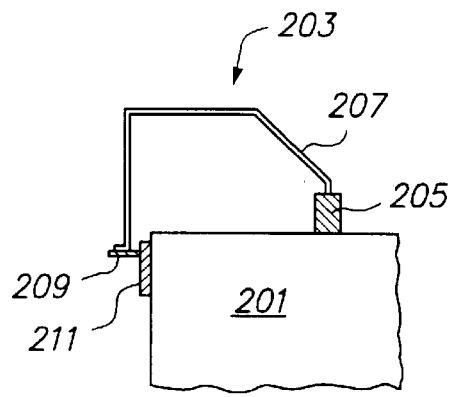
FIG. 2 is a cross-sectional view of a bezel assembly mounted to a display screen via the CRT mounting tabs according to the prior art.

FIG. 2 is cross-sectional view of a portion of a bezel assembly attached to a CRT screen 201 as may be used with or without a touchscreen system. As illustrated, CRT screen 201 does not include a touchscreen assembly. The bezel assembly is comprised of a resilient member 203, typically fabricated from molded plastic, that holds a seal 205 against the front surface of CRT screen 201. Seal 205 is held against screen 201 by the pressure applied by a cantilever portion 207 of resilient member 203. Alternatively, seal 205 may be bonded, temporarily or permanently, to both resilient member 203 and CRT screen 201. Regardless of whether pressure or a bonding agent is used to maintain seal 205 against screen 201, seal 205 prevents contaminants from entering the CRT housing and potentially damaging the internally mounted components, e.g., CRT power supply or, in the case of a touchscreen system, the touchscreen components.

In a typical configuration resilient member 203 is attached to CRT screen 201 by means of four CRT corner tabs 209, generally attached to CRT screen 201 via an implosion band 211. CRT screen 201, corner tabs 209, and implosion band 211 are shown in a perspective view of a CRT tube 300 in FIG. 3. It is understood that tabs 209 are not the only manner in which the bezel assembly can be held in place against screen 201. For example as shown in FIG. 4, CRT corner tabs 209 can be used to mount CRT tube 300 to a housing assembly 401, shown in part. A bezel assembly 403 is attached to housing assembly 401, for example using bolts, complementary locking members, etc.

Figure 5:
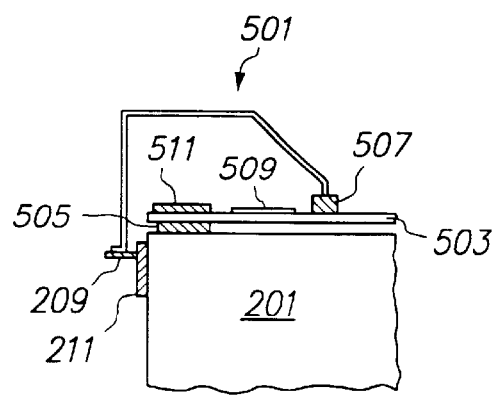
FIG. 5 is a cross-sectional view of a bezel assembly mounted to a display screen with an acoustic touchscreen overlay according to the prior art.

FIG. 5 is a cross-sectional view of a bezel assembly 501 attached indirectly to a CRT screen 201, the bezel mounting configuration being similar to that shown in FIG. 2. In this configuration a touchscreen overlay screen 503 is attached via hoop and loop material, adhesives, or other means 505 to display screen 201. In addition, due to the placement of acoustic reflective elements 509 and transducers 511 beneath bezel assembly 501 and behind sealing member 507, the acoustic absorption of member 507 must be minimized. It is understood that even if the components of the acoustic touchscreen system, e.g., transducers, reflective arrays, etc., are mounted directly to display surface 201 in a configuration similar to that shown in FIG. 2 (commonly referred to as a direct-on-tube acoustic touchscreen system), the acoustic absorption of the sealing member must still be minimized.

Although the acoustic absorption of the sealing member must be minimized, as noted in the example configuration shown in FIG. 5, often this design goal is in direct conflict with the goal of maximizing sealing performance. For example, a silicon rubber chalking seal provides a robust seal, but absorbs too much acoustic signal to be used with a typical acoustic touchscreen system. Conversely, a lightweight, open cell foam under light compression will have minimal impact on the acoustic signal, but will provide limited sealing performance.

One approach to sealing an acoustic touchscreen is to use a relatively narrow seal, approximately 1 millimeter or less in width. Due to the narrow width of such a seal, a variety of sealing materials will exhibit acceptable levels of acoustic absorption, including those fabricated from solid rubbers. It is well known, however, that a seal is not mechanically stable unless it is wider than it is tall. Thus for a 1 millimeter wide seal, the height must be less than 1 millimeter, and preferably much less than 1 millimeter. As a consequence of these requirements, i.e., a seal less than 1 millimeter in width and a height much less than the width, the design constraints placed upon the bezel assembly and the display housing can be quite demanding. This is especially true for spherically or cylindrically curved touch surfaces.

Figure 3:
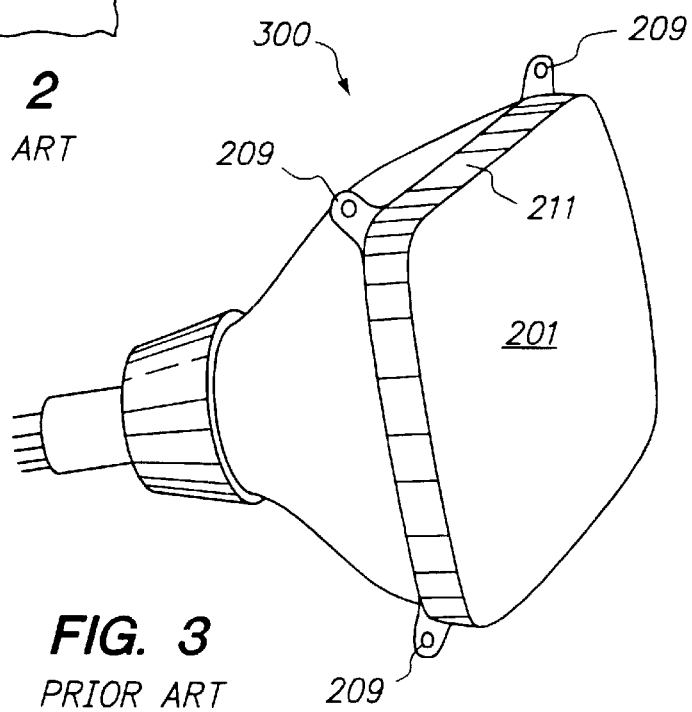
FIG. 3 is a perspective view of a CRT and the CRT mounting tabs according to the prior art.
Figure 4:
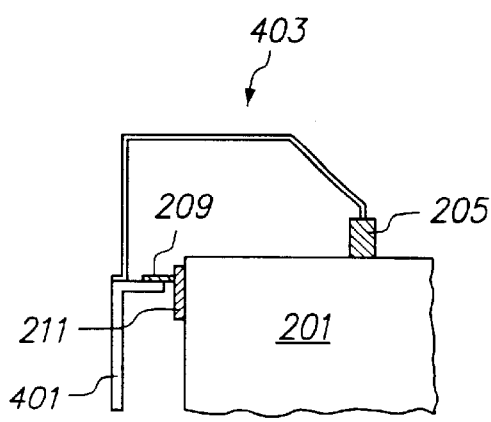
FIG. 4 is a cross-sectional view of a bezel assembly mounted to a display screen via the display housing according to the prior art.
Figure 6:
FIG. 6 conceptually illustrates the invention.

The present invention overcomes the problems associated with the prior sealing systems through the use of a tensioning band anchored at the CRT mounting tabs, i.e., tabs 209 in FIG. 3. The concept behind the tensioning band is illustrated in FIG. 6. As shown, a tension element 601 in the shape of a segment of a circle with a length S and a radius of curvature R sweeps out an angle θ, in radians, equal to S/R. If tension element 601 is under tension T, both ends of the segment are subject to a force of magnitude T. The forces at the two ends of the tension element do not completely cancel, however, as they are not completely parallel. Each vector 603 points downward with an angle θ/2 equal to S/2R. Thus vectors 603 have a downward vertical component of (T)sin(θ/2), which is approximately TS/2R. Therefore the net force applied to element 601 is TS/R, yielding a force per unit length of T/R. Note that this force per unit length is constant along the length. This is in sharp contrast to cantilever arrangements such as shown in FIG. 2 in which the force per unit length is a strong function of the distance to the corner mounting points.

Figure 7:
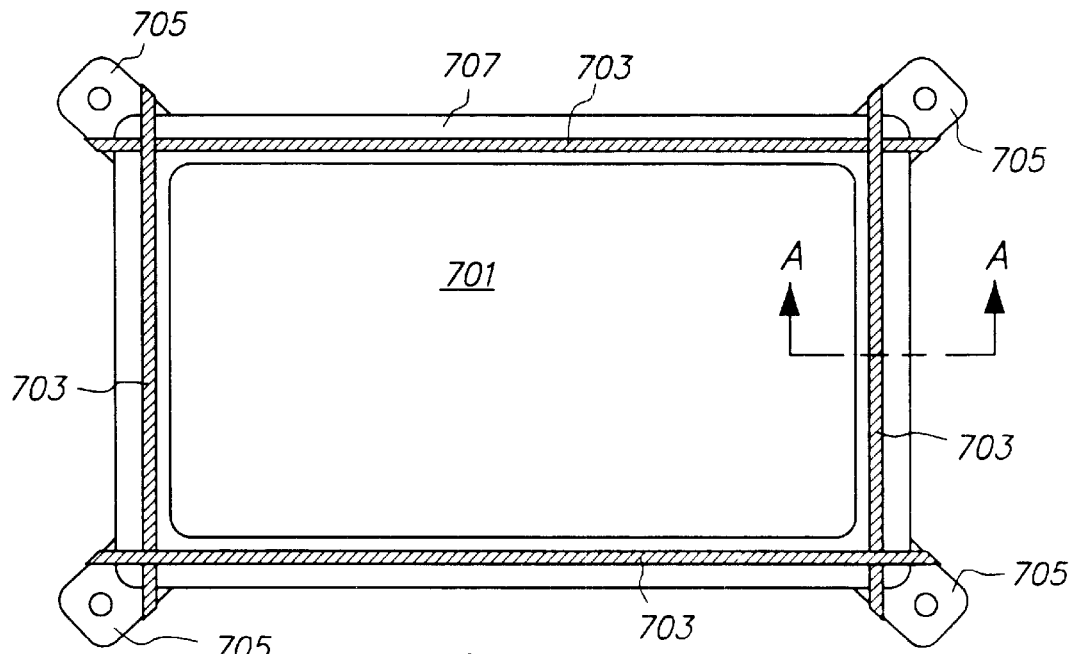
FIG. 7 illustrates a CRT with a plurality of tension straps coupled to the CRT mounting tabs in accordance with the invention.
Figure 8:
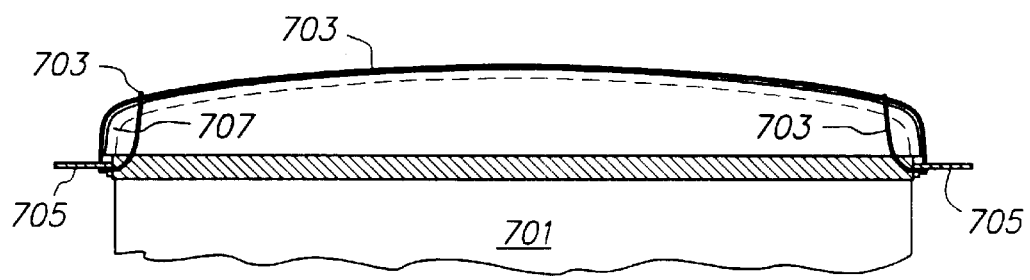
FIG. 8 is a side view of the assembly shown in FIG. 7.
Figure 9:
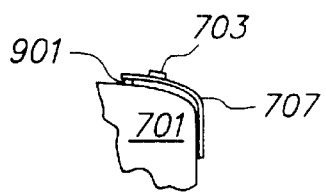
FIG. 9 illustrates a cross-section of the assembly shown in FIG. 7 at a location A—A.

FIG. 7 illustrates a CRT 701 with a plurality of tension straps 703 coupled to the CRT via CRT mounting tabs 705. FIG. 8 is a side view of the assembly shown in FIG. 7 and FIG. 9 is a cross-sectional view of the assembly shown in FIG. 7 at a location A—A. It should be understood that although not visible in these figures, an acoustic touchscreen system is preferably coupled to the CRT screen utilizing either the direct-on-tube or overlay configuration.

As shown in FIG. 7, four straps 703 are used to hold frame 707 in place and to apply pressure to a sealing member 901. It should be understood, however, that a single continuous strap or a number of straps less than four can also be used in accordance with the invention. Additionally, and as described in further detail below, straps 703 can be integral, either in whole or in part, to frame 707.

For the embodiment illustrated in FIGS. 7–9, if the touchscreen surface (or the surface of CRT screen 701 assuming a direct-on-tube acoustic touchscreen) is approximately spherically curved, the surface curvature can be considered to be approximately constant. Thus tension straps 703, as described above, provide a uniform compressive force per unit length along the entire perimeter of seal 901 even though the only anchoring points are the four CRT mounting tabs.

The present invention offers several advantages over the cantilevered approach of the prior art. First, due to the simplicity of the tension straps, the seal housing can be made both very thin and lightweight. Second, the seal housing can be made to be relatively flexible, thus allowing the housing to easily flex and conform to the shape of the touch surface. Third, an extremely small and uniform gap can be maintained between the seal housing and the touch surface, e.g., less than 1 millimeter, thus allowing the designer to select from a wider range of sealing materials that still meet the acoustic signal absorption requirements of the system.

Figure 10:
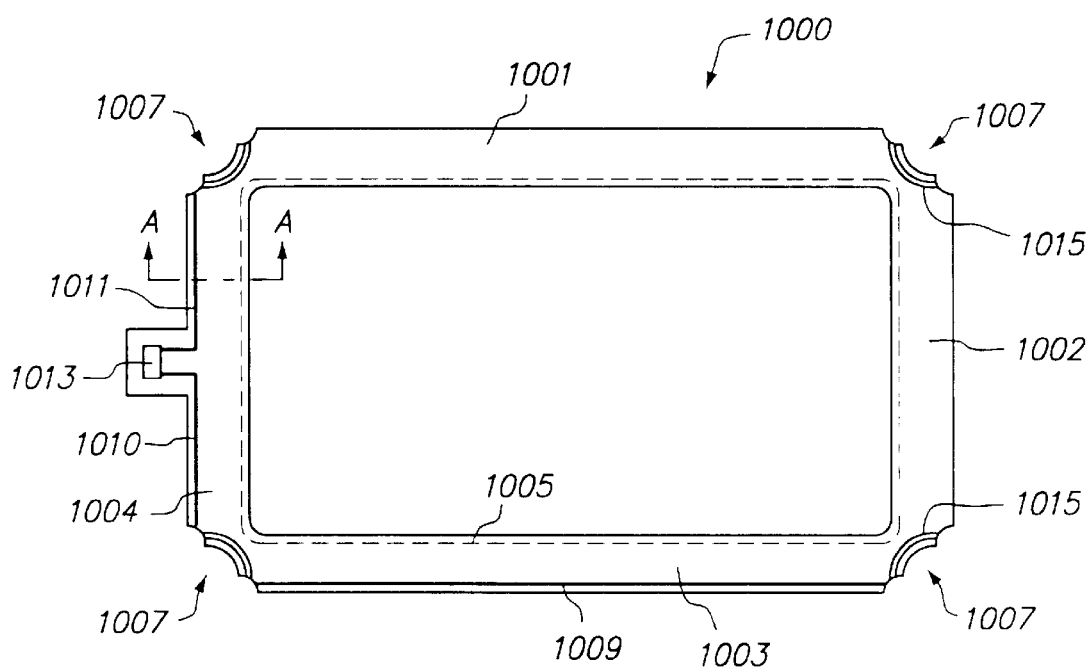
FIG. 10 is a top view of a plastic frame which serves as the tension straps or elements in accordance with the invention.

FIGS. 10–13 show a preferred embodiment of the invention. FIG. 10 is a top view of a frame 1000 which serves as the tension straps or elements in accordance with the invention. In other words, the material comprising frame 1000 provides the necessary tension along sides 1001–1004 to insure that a uniform compressive force is applied to the underlying seal shown in phantom at 1005. Preferably frame 1000 is fabricated from a single piece of plastic material, e.g., thermoplastic or thermosetting plastic. Alternatively, frame 1000 can include separate tensioning elements that may or may not be integrated into the frame (see, for example, the external strapping arrangement shown in FIG. 7).

Each corner 1007 of frame 1000 may utilize cut-aways, as shown in FIG. 10, thus allowing easy access to the underlying acoustic components, e.g., acoustic transducers. Alternatively, frame 1000 may cover and hence further protect the underlying transducers. A plurality of wiring channels 1009–1011, fabricated into either the upper surface, as shown, or the lower surface of frame 1000, is preferably provided for containment of the transducer wiring. For example as shown, channel 1009 is used for the y-transmit transducer, channel 1010 is used for the x- and y-receive transducers, and channel 1011 is used for the x-transmit transducer (see, for clarification, FIG. 1). A cable exit hole 1013 is provided, thus allowing easy coupling of the transducers to the controller circuitry.

Figure 11:
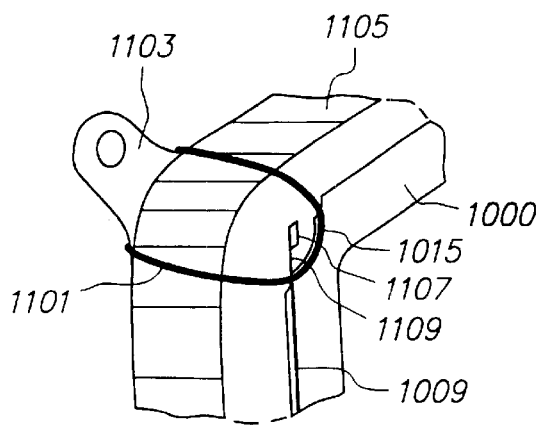
FIG. 11 is a perspective view of the tensioning frame shown in FIG. 10 mounted to a CRT mounting tab.

Each corner 1007 includes a groove 1015. As shown in detail in FIG. 11, a retaining strap 1101 loops around CRT mounting tab 1103 and along groove 1015 in order to provide the corner mounting of frame 1000. Also shown in FIG. 11 are the CRT implosion band 1105, acoustic transducer 1107, and a wire 1109 from transducer 1107 mounted within channel 1011.

Figure 12:
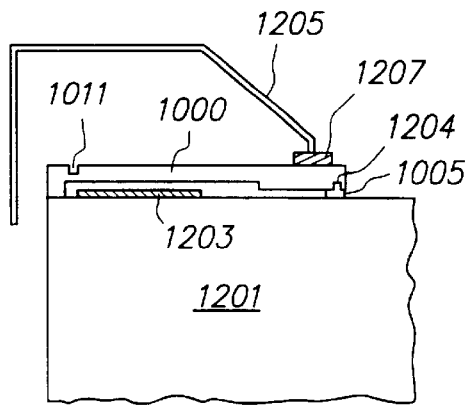
FIG. 12 is a cross-sectional view of the tensioning frame shown in FIG. 10 mounted to a CRT system utilizing a direct-on-tube acoustic touchscreen.

FIG. 12 is a cross-sectional view of frame 1000 at a location A—A, frame 1000 mounted to a CRT screen 1201. In this embodiment a direct-on-tube acoustic system has been applied to screen 1201, shown in FIG. 12 by acoustic reflective array 1203. Seal 1005, preferably mounted within a groove 1204 within the surface of frame 1200, is selected from a variety of seals that provide both the necessary acoustic absorption characteristics and the desired sealing properties. For example, seal 1005 may utilize an open cell foam such as that taught in U.S. Pat. No. 5,332,238, a closed cell foam or an expanded polymer such as that taught in U.S. Pat. No. 5,784,054, or a gel such as taught in copending U.S. patent application Ser. No. 09/285,407, filed Apr. 2, 1999, the disclosures of which are incorporated herein by reference for all purposes. Alternatively, seal 1005 may be an o-ring or other prefabricated and presized sealing member. A bezel assembly 1205 is sealed against frame 1000 utilizing a conventional seal 1207.

Figure 13:
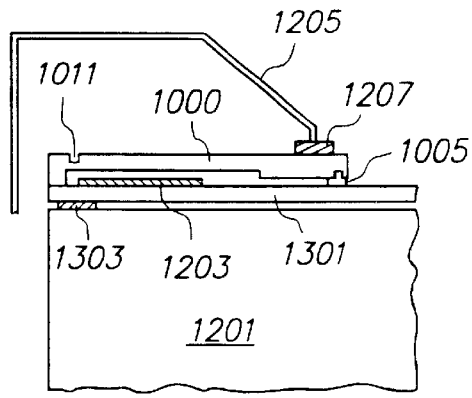
FIG. 13 is a cross-sectional view of the tensioning frame shown in FIG. 10 mounted to a CRT system utilizing an acoustic touchscreen overlay.

The cross-sectional view shown in FIG. 13 is similar to that shown in FIG. 12 except that an overlay acoustic touchscreen is used instead of a direct-on-tube system. Therefore attached to CRT 1201 is an overlay substrate 1301 attached via hoop and loop material, adhesives, or other means 1303. Accordingly, acoustic system components such as reflective array 1203 are attached to overlay substrate 1301 rather than directly to CRT screen 1201.

Figure 14:
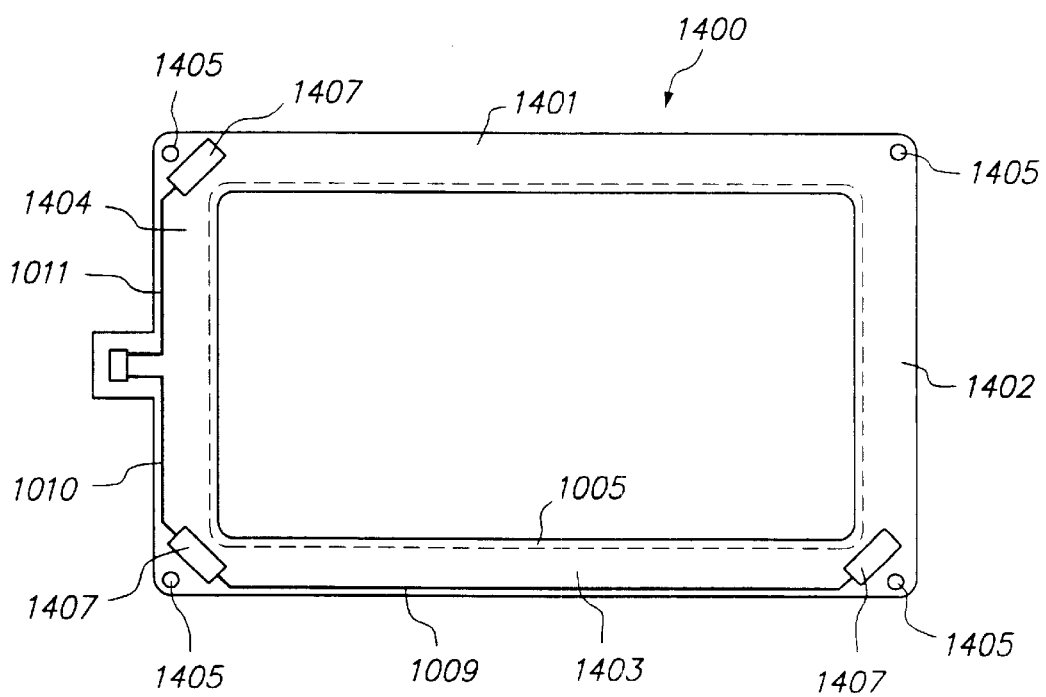
FIG. 14 is a top view of an alternative embodiment of the invention.

FIG. 14 is a top view of an alternative embodiment of the invention. As in the embodiment shown in FIG. 10, frame 1400 preferably provides the desired tension along sides 1401–1404 although it is also envisioned that separate tensioning elements may be used that are either integral to or separate from frame 1400. Similarly, frame 1400 preferably includes seal 1005 and wiring channels 1009–1011. Frame 1400, however, is attached via outwardly spring-loaded fasteners, complimentary fasteners, bolts, or other fastening means that provide tension at the four corners 1405 of frame 1400. Additionally, frame 1400 includes a plurality of access ports 1407, thus allowing easy access to the underlying acoustic components, e.g., acoustic transducers.

Figure 15:
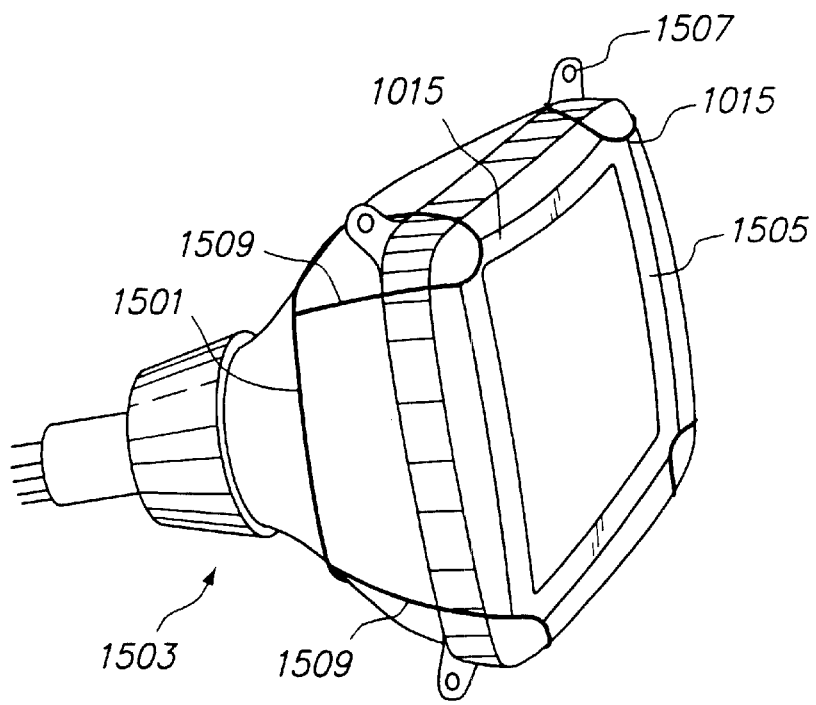
FIG. 15 is a perspective view of a tensioning frame coupled to a CRT using a retaining ring.
Figure 16:
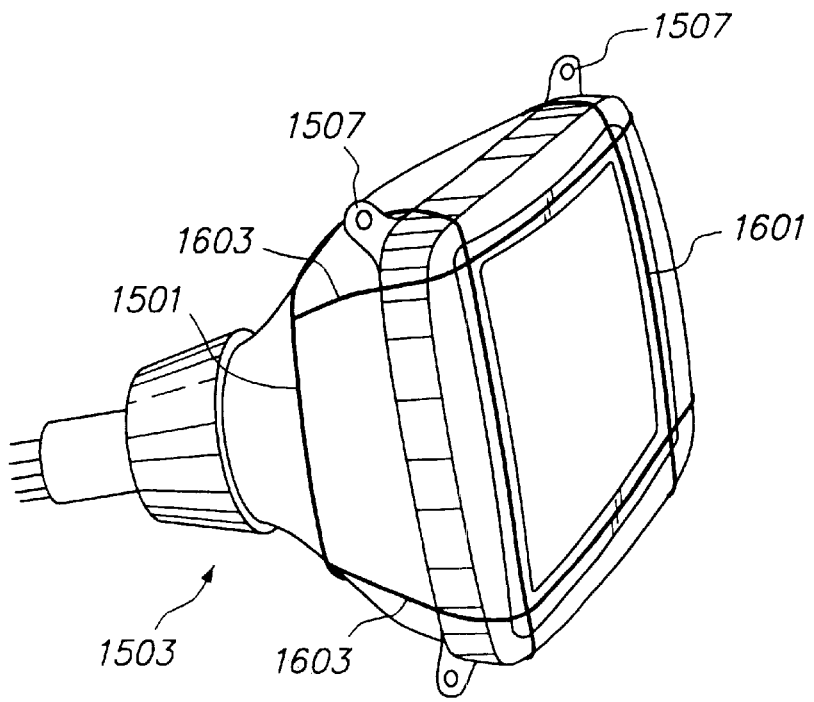
FIG. 16 is a perspective view of a tensioning frame coupled to a CRT using a retaining ring using an alternate approach.

FIGS. 15 and 16 illustrate two embodiments of the invention in which the frame is not attached to the CRT mounting tabs but is instead attached to a retaining ring 1501. Retaining ring 1501 preferably fits around the body of CRT 1503. Although retaining ring 1501 is preferably attached to CRT 1503, thus allowing easy assembly of the CRT with the touchscreen system and frame, it is understood that a retaining ring or other coupling means can also be integrated into the CRT housing (not shown).

Frame 1505 is similar to frame 1000 including the use of guide grooves 1015. In this embodiment, however, instead of using a strap that is coupled to the CRT mounting tabs 1507, straps 1509 are attached to retaining ring 1501. Frame 1601 is similar to the frame shown in FIG. 7 due to the use of separate tensioning straps 1603. In this embodiment tensioning straps 1603 are coupled to the retaining ring instead of CRT mounting tabs 1507.

Figure 17:
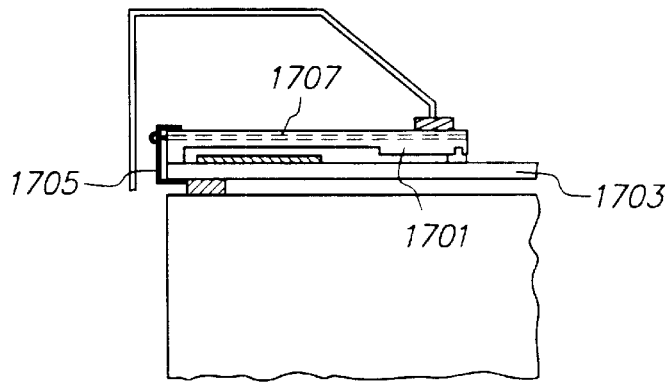
FIG. 17 is a cross-sectional view of another alternative embodiment of the invention in which the tensioning frame is attached directly to a touchscreen overlay substrate.
Figure 18:
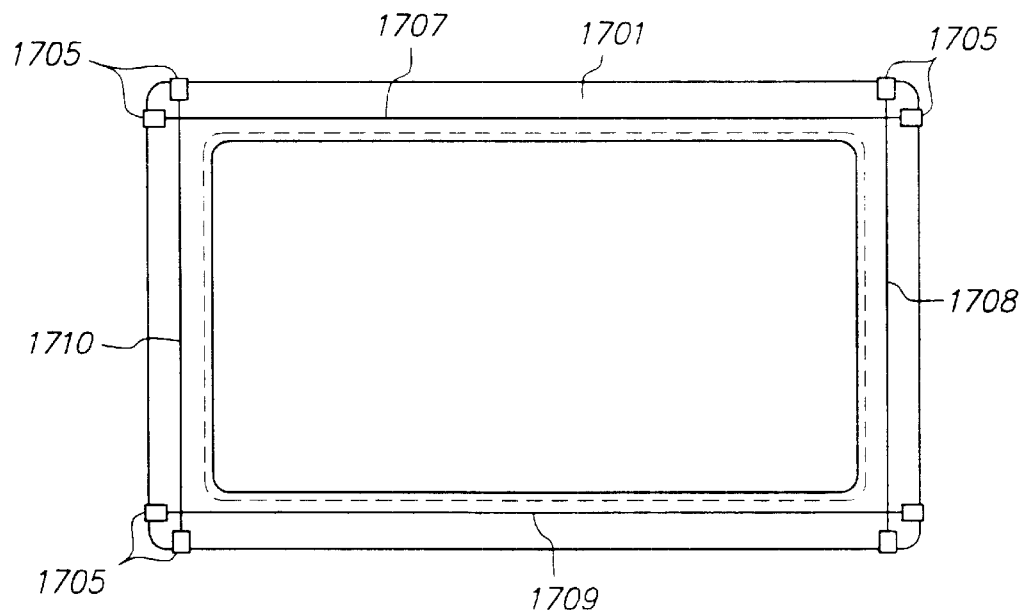
FIG. 18 is a top view of the embodiment shown in FIG. 17.

FIG. 17 illustrates another alternative embodiment of the invention. This embodiment is designed for use with an acoustic overlay system. Unlike the system described in reference to FIG. 13, frame 1701 is attached directly to overlay substrate 1703, for example through the use of clips 1705 and tension cables 1707–1710. Note that FIG. 17 only shows a single tension cable 1707, in phantom, although all four tension cables 1707–1710 are shown in FIG. 18. Preferably clips 1705 are mounted near the corners of frame 1701 on either side of each corner as shown in FIG. 18.

It should be understood that the tension of the straps used in the present invention, e.g., 1101, 1509, and 1603, can be adjusted, if desired, using a variety of techniques. For example, a simple coupling device can be used to couple two ends of a continuous strap, e.g., strap 1101, or to couple a strap to a retaining member, e.g., straps 1509 and 1603. The coupling device can utilize an adjustable spring, a threaded coupling, or other means to vary the tension applied to the straps. As such tensioning devices are well known by those of skill in the art, further explanation will not be provided herein.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. An acoustic touchscreen system, comprising:
   an acoustic touchscreen coupled to a display device, said acoustic touchscreen defining a touch-sensitive area on a corresponding touchscreen surface;
   a frame mounted to said acoustic touchscreen, said frame located above said acoustic touchscreen, wherein a central opening in said frame substantially borders said touch-sensitive area;
   a plurality of coupling means, each of said coupling means coupling a corner portion of said frame to said display device; and
   a seal interposed between a lower surface of said frame and said acoustic touchscreen surface, wherein said frame imposes a substantially uniform compressive force on a portion of said seal contacting an approximately spherically curved portion of said acoustic touchscreen surface.

2. The acoustic touchscreen system of claim 1, wherein said acoustic touchscreen is a direct-on-tube acoustic touchscreen.

3. The acoustic touchscreen system of claim 1, wherein said acoustic touchscreen is an overlay acoustic touchscreen.

4. The acoustic touchscreen system of claim 1, said plurality of coupling means comprising a plurality of retaining straps.

5. The acoustic touchscreen system of claim 4, further comprising a plurality of mounting tabs rigidly coupled to said display device, wherein said plurality of retaining straps couple said plurality of mounting tabs to said frame corner portions.

6. The acoustic touchscreen system of claim 5, wherein each of said plurality of mounting tabs is rigidly coupled to each of a plurality of display device corners.

7. The acoustic touchscreen system of claim 5, wherein each of said plurality of mounting tabs is rigidly coupled to an implosion band encircling said display device, and wherein each of said plurality of mounting tabs is proximate each of a plurality of display device corners.

8. The acoustic touchscreen system of claim 4, said frame further comprising a grooved portion near each of said frame corner portions, wherein each of said plurality of retaining straps is held within each of said grooved portions.

9. The acoustic touchscreen system of claim 4, further comprising a retaining ring fixably coupled to said display device, wherein said plurality of retaining straps couple said retaining ring to said frame corner portions.

10. The acoustic touchscreen system of claim 1, said plurality of coupling means comprising a plurality of tensioning straps, wherein a portion of each of said plurality of tensioning straps is proximate an upper surface of said frame.

11. The acoustic touchscreen system of claim 10, further comprising a plurality of mounting tabs rigidly coupled to said display device, wherein said plurality of tensioning straps are coupled to said plurality of mounting tabs.

12. The acoustic touchscreen system of claim 11, wherein each of said plurality of mounting tabs is rigidly coupled to each of a plurality of display device corners.

13. The acoustic touchscreen system of claim 11, wherein each of said plurality of mounting tabs is rigidly coupled to an implosion band encircling said display device, and wherein each of said plurality of mounting tabs is proximate each of a plurality of display device corners.

14. The acoustic touchscreen system of claim 10, further comprising a retaining ring fixably coupled to said display device, wherein said plurality of tensioning straps are coupled to said retaining ring.

15. The acoustic touchscreen system of claim 1, wherein said seal is selected from the group of seals consisting of open cell foams, closed cell foams, expanded polymers, or gels.

16. The acoustic touchscreen system of claim 1, said frame further comprising a channel located on said lower surface and proximate to said central opening, wherein a portion of said seal is within said channel.

17. The acoustic touchscreen system of claim 1, said frame further comprising at least one wiring channel.

18. The acoustic touchscreen system of claim 1, further comprising a bezel assembly and a second seal, said second seal interposed between a portion of said bezel assembly and an upper surface of said frame.

19. The touchscreen system of claim 1, wherein two portions of said acoustic touchscreen surface are approximately spherically curved.

20. The touchscreen system of claim 1, wherein four portions of said acoustic touchscreen surface are approximately spherically curved.

21. The touchscreen system of claim 1, wherein said frame is plastic.

22. An acoustic touchscreen system, comprising:

an overlay acoustic touchscreen coupled to a display device, said overlay acoustic touchscreen defining a touch-sensitive area on a corresponding touchscreen surface;

a frame mounted to said overlay acoustic touchscreen, said frame located above said overlay acoustic touchscreen, wherein a central opening in said frame substantially borders said touch-sensitive area;

a plurality of coupling means, each of said coupling means coupling a corner portion of said frame to said overlay acoustic touchscreen; and a seal interposed between a lower surface of said frame and said acoustic touchscreen surface, wherein said frame imposes a substantially uniform compressive force on a portion of said seal contacting an approximately spherically curved portion of said acoustic touchscreen surface.

23. The acoustic touchscreen system of claim 22, said plurality of coupling means comprising a plurality of clips.

* * * * *